Sept. 4, 1962
O. R. GRASS
3,052,491
FLEXIBLE CONNECTOR FOR RIGID PIPES
Filed March 23, 1959
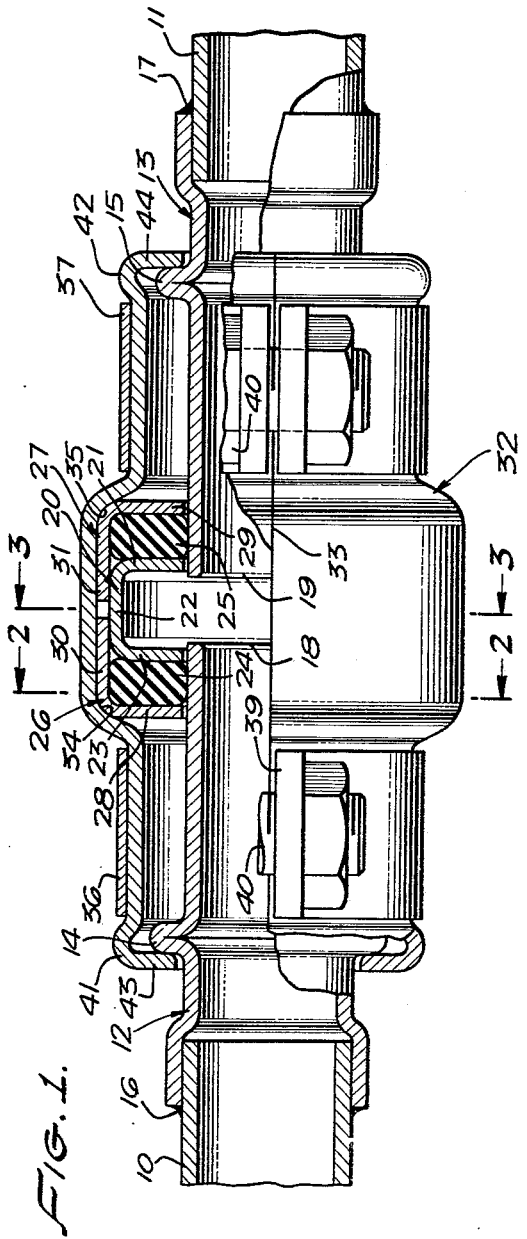
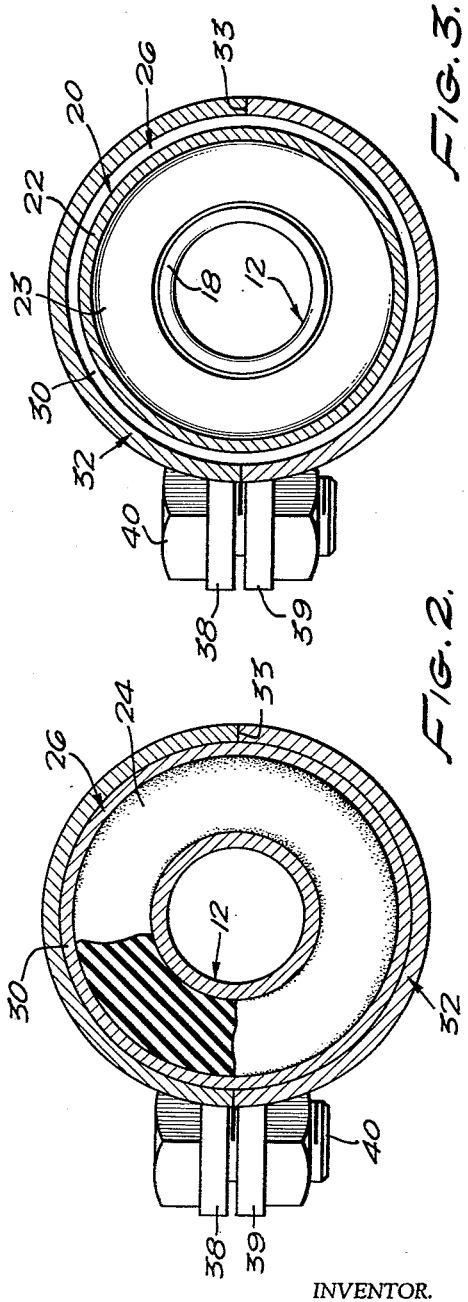
INVENTOR.
OTTO R. GRASS
BY
Hazard & Miller
ATTORNEYS 3,052,491
FLEXIBLE CONNECTOR FOR RIGID PIPES
Otto R. Grass, 19115 S. Hamilton St., Gardena, Calif.
Filed Mar. 23, 1959, Ser. No. 801,270
2 Claims. (Cl. 285—233)

This invention relates to improvements in couplings for connecting the adjacent ends of two approximately aligned conduits.

A primary object of the present invention is to provide an improved coupling which is of such design that the parts thereof can be readily formed from drawn metal stampings. Many couplings heretofore designed for connecting conduits have had the parts thereof formed of diecastings or even machined castings. Such constructions must consequently be made excessively heavy for purposes of strength which is an objection, particularly where the coupling is used to connect conduits in aircraft. By having the coupling so designed that it may be formed from metal stampings a lighter weight coupling is possible, but the metal employed can be very strong and light weight and defects, if any, that exist therein will usually be found as a result of the stamping and drawing operations and consequently discarded.

Another object of the invention is to provide an improved coupling, the parts of which may be readily assembled together and applied around the adjacent ends of conduits and which on being tightened, will cause deformable rubber or rubberlike seals to be compressed and deformed into good sealing engagement with the conduits so as to effectively prevent leakage.

In this connection, another object of the invention is to provide a coupling or connector wherein the rubber or rubberlike seals will be adequately protected against deterioration by exposure to the fluid that is being conducted through the conduit. Replacement of the seals can be easily and quickly accomplished whenever occasion may require.

With the foregoing and other objects in view, which will be made manifest in the following detailed description and specifically pointed out in the appended claims, reference is had to the accompanying drawings for an illustrative embodiment of the invention, wherein:

FIGURE 1 is a view in side elevation parts being broken away and shown in vertical section illustrating the improved coupling or connector embodying the present invention; and FIGS. 2 and 3 are vertical sections taken substantially upon the lines 2—2 and 3—3, respectively, on FIG. 1 in the direction indicated.

Referring to the accompanying drawings wherein similar reference characters designate similar parts throughout, 10 and 11 indicate two conduits arranged in approximate alignment, the adjacent ends of which are to be connected together by the improved coupling or connector. Usually these conduits are deformed near their adjacent ends so as to have external annular beads formed thereon which can be engaged by the coupling or connector to hold the conduits against axial separation. Such integral beads may be employed on the conduits 10 and 11 and can be used with the present coupling. However, I prefer to employ adapters or extensions 12 and 13 on which external annular beads 14 and 15 are formed and to weld, as at 16 and 17, these adapters or extensions onto the conduits 10 and 11 so as to form continuations thereof. This arrangement is preferred in order to facilitate the proper spacing and location of the beads 14 and 15 from the extreme ends of the conduits which are indicated at 18 and 19.

The coupling embodying the present invention comprises a central bridging member 20. This bridging member is annular in form arranged to encircle the adjacent ends 18 and 19 of the conduits. It is preferably formed from a sheet metal stamping which is initially drawn to form one radial flange 21 and a back 22. The other flange 23 can be formed on the bridging member such as by a spinning operation. This bridging member is telescopically slipped onto one of the adapters or extensions 12 or 13 prior to assembling the adapter or extension with its respective conduit. When in applied position the bridging member 20 occupies a position encircling the ends 18 and 19 and bridging the space or gap therebetween. Against the outer sides of the bridging member there are two annular deformable rubber or rubber-like sealing rings 24 and 25. These sealing rings are designed to be axially compressed and deformed by axial pressure into sealing engagement with the adjacent ends of the adapters or extensions 12 and 13 very close to the extreme ends 18 and 19 thereof.

Followers 26 and 27 are provided. These followers are also annular in form and are angular in cross-section as illustrated on FIG. 1. Each has an inwardly extending flange 28 and 29, respectively, and a back or cylindrical portion 30 and 31, respectively. The followers can likewise be formed of drawn sheet metal stampings. Preferably the backs 30 and 31 are so arranged as to telescopically slide over the back 22 of the bridging member 20.

Around the followers there is a sleeve 32. This sleeve is in the nature of a split sleeve formed of two semi-cylindrical halves. The parts of this sleeve can likewise be formed from sheet metal stampings. The two halves may abut each other in metal-to-metal contact at 33, although such abutment at this point is not absolutely necessary. Centrally, the sections of the sleeve 32 are internally enlarged to provide inclined camming surfaces 34 and 35 which are engageable with the outer corners of the followers 26 and 27. As the sections of the sleeve 32 are tightened or contracted about the ends of the conduits, these camming surfaces force the followers 26 and 27 axially towards each other, thus axially compressing the sealing rings 24 and 25 and deforming these sealing rings, causing them to expand inwardly into firm sealing contact with the exteriors of the conduits adjacent the ends 18 and 19.

Tightening bands 36 and 37 encircle the parts of the sleeve on opposite sides of the enlargement. These tightening bands are preferably equipped with opposed ears 38 and 39 through which bolts 40 extend. The sections of the sleeve outwardly of the tightening bands are externally enlarged or beaded as indicated at 41 and 42 and are equipped with radially inward extending flanges 43 and 44 which are engageable with the outer sides of the beads 14 and 15 to hold the conduits against axial separation. Except for the direct engagement between the ends of the sleeve sections and the beads 14 and 15 the sleeve has an internal clearance elsewhere with respect to all portions of the adapters or extensions 12 and 13 inwardly of the beads.

It will be appreciated from the above-described construction that most of the parts of the improved connector or coupling are so designed that they can be readily formed from sheet metal stampings. As a result thereof the improved coupling can be made quite light in weight. Thus, for a connector or coupling designed to couple conduits of 2" diameter, a typical weight of the improved coupling is only 2.6 ounces as compared to the 8 ounce weight of a diecast coupling. Furthermore, on tightening the sections of the sleeve towards each other the sealing rings are automatically compressed and deformed into firm sealing engagement with the exterior of the adapters or extensions 12 and 13. Danger of over-compression of the sealing rings is avoided by either or both the tightening of the sections of the sleeves against the backs 30 and 31 of the followers 26 and 27 and/or the mutual engagement of the sections of the sleeve at 33. The inner edges of the bridging member 20 are shown with a clearance with respect to the exteriors of the adapters or extensions. This clearance may be regarded as somewhat exaggeratedly shown as very little, if any, clearance is required at this point. The same is true of the clearances shown between the followers and the adapters or extensions. With a minimum amount of clearance at these points very little of the material of the sealing rings is exposed to the fluid that is being conducted through the conduits. Furthermore, danger of extrusion of the sealing rings beneath the bridging member or beneath the followers is avoided.

Whenever occasion requires the replacement of a sealing ring or both sealing rings, the tightening bands 36 and 37 can be removed and the sections of the sleeve can be removed. The bridging member and a follower together with the intervening sealing ring can be slid axially onto one of the adapters or extensions and the other sealing ring can be slipped through the gap left between the extreme ends 18 and 19. A replacing sealing ring can be slipped through the same gap, and the parts returned to the positions as shown. To accomplish this replacement of either or both of the sealing rings an adequate length of the cylindrical adapters or extensions 12 and 13 is left between the extreme ends 18 and 19 and the beads 14 and 15. Also, the spacing between the ends 18 and 19 should be slightly greater than the normal or undeformable thickness of each sealing ring.

In couplings or connectors of this character many specifications require that some flexibility of the conduits be permitted. Frequently, a specification will require that one conduit, such as the conduit 10, be capable of bending as much as 4° within the coupling relatively to the conduit 11. With the improved coupling or connector it will be readily appreciated that such movement is possible, the beads 14 and 15 merely sliding within their respective flanges 43 and 44 on the sleeve. When this occurs movement of the adapters or extensions 12 and 13 at or near their points of engagement with the seals 24 and 25 is very small. Consequently when one conduit is subjected to a bending moment relatively to the other conduit, there is no tendency to break or loosen the sealing engagement between the sealing rings and the adapter or extension.

It will be appreciated by those skilled in the art that the improved connector or coupling is so designed that it may be made of easily produced, lightweight sheet metal parts; that the parts may be readily assembled together and when assembled, excellent seals are created between the sealing rings and the ends of the conduits. These seals can be maintained even though one conduit tends to flex relatively to the other and furthermore, the material of the sealing rings is adequately protected against exposure to the fluid transmitted through the conduits and is also adequately protected against over-compression and consequently extrusion.

Various changes may be made in the details of construction without departing from the spirit and scope of the invention as defined by the appended claims.

I claim:

1. A connector for two approximately aligned conduits having external shoulders near their ends comprising an annular bridging member adapted to be positioned around said ends between the shoulders and bridge the space between said ends, there being a small clearance between the interior of said bridging member and said ends, deformable annular sealing rings against the sides of the bridging member also disposed between the shoulders, followers against the outer sides of the sealing rings and disposed between the shoulders, said followers having portions in telescopic slidable engagement with the exterior of the bridging member and having a small clearance between the interiors thereof and the exteriors of said ends, a split sleeve encircling the ends of the conduits and disposed around the bridging member, sealing rings and followers, said split sleeve presenting conical surfaces on the interior thereof engageable with the followers to urge the followers towards each other as the sections of the sleeve are tightened towards each other to compress the sealing rings, the sections of the split sleeve also presenting cylindrical surfaces engageable with portions of the followers to limit contraction of the split sleeve, the sections of the split sleeve also presenting portions engageable with the outer sides of the shoulders on the conduits to resist separation of the conduits but which otherwise are spaced from the exteriors of the conduits by a small clearance, means for tightening the sections of the split sleeve towards each other, the mentioned clearances enabling one conduit to assume a position slightly angularly related to the other but the seal between the sealing rings and the conduits to be maintained.

2. A connector for two approximately aligned conduits having external shoulders near their ends comprising an annular bridging member adapted to be positioned around said ends between the shoulders and bridge the space between said ends, said bridging member being formed of sheet metal and presenting edges thereof toward the exteriors of the conduits, there being a small clearance between the edges of the bridging member and the exteriors of said ends, deformable annular sealing rings against the sides of the bridging member also disposed between the shoulders, followers against the outer sides of the sealing rings also disposed between the shoulders, said followers being formed of sheet metal and presenting edges thereof toward the exteriors of the conduits and having portions in telescopic slidable engagement with the exterior of the bridging member, there being a small clearance between the edges of the followers and the exteriors of said ends, a split sleeve encircling the ends of the conduits and disposed around the bridging member, sealing rings, and followers, said split sleeve having its sections formed of sheet metal and presenting conical internal surfaces engageable with the followers to urge the followers towards each other as the sections of the sleeve are tightened towards each other to compress the sealing rings, the sections of the split sleeve also presenting cylindrical surfaces engageable with portions of the followers to limit contraction of the split sleeve, the sections of the slit sleeve also presenting portions engageable with the outer sides of the shoulders on the conduits to resist separation of the conduits and presenting edges which are adjacent thereto which are spaced from the exteriors of the conduits by small clearances, the sections of the split sleeve being otherwise spaced from the exteriors of the conduits, means for tightening the sections of the slit sleeve towards each other, the mentioned clearances between the edges of the bridging member, the followers, and the sections of the split sleeve enabling one conduit to assume a position slightly angularly related to the other but the seal between the sealing rings and the conduits to be maintained.

References Cited in the file of this patent

UNITED STATES PATENTS

| 2,084,761 | Bradley | June 22, 1937 |
| 2,781,207 | Detweiler | Feb. 12, 1957 |

FOREIGN PATENTS

| 465,850 | Germany | Sept. 26, 1928 |
| 318,163 | Great Britain | Aug. 26, 1929 |
| 895,276 | Germany | Sept. 24, 1953 |